April 3, 1951 M. R. EUVERARD ET AL 2,546,990
DRY FILM GAUGE
Filed June 25, 1949 2 Sheets-Sheet 1

INVENTORS.
Maynard R. Euverard
Paul N. Gardner
BY

April 3, 1951 M. R. EUVERARD ET AL 2,546,990
DRY FILM GAUGE

Filed June 25, 1949 2 Sheets-Sheet 2

*INVENTORS.*
Maynard R. Euverard
Paul N. Gardner
BY
*Eric C. Franke*

UNITED STATES PATENT OFFICE 2,546,990

DRY FILM GAUGE

Maynard R. Euverard, Short Hills, N. J., and Paul N. Gardner, Bethesda, Md., assignors to Interchemical Corporation, New York, N. Y., a corporation of Ohio Application June 25, 1949, Serial No. 101,364

7 Claims. (Cl. 33—125)

The present invention relates to an instrument for determining the thickness of foils and dry films of paints, lacquers, varnishes, plastic coatings, and the like.

In the co-pending application of one of us, Serial No. 2,769 of January 16, 1948, now U. S. Patent No. 2,507,592 issued on May 16, 1950, there is an instrument disclosed for measuring the thickness of wet films. In the preferred form the device of the said disclosure consists of a composite body having two co-axial outer wheels provided with film-penetrating edges, an eccentric inner wheel with a band-like measuring surface at the rim, and intermediate circular sections of lesser diameter which separate the outer wheels from the inner wheel. The measuring surface of the inner wheel is at one point in alignment with the edges of the two outer wheels or a given minimum measuring distance below the edges, and recedes thereafter until reaching another point the depth of which below the said film penetrating edges is at least equal to the thickness of any film to be measured. The instrument has calibration marks at the margin of one of the outer wheels. A shaft, inserted into an accurately machined bearing and terminating in thumb and finger holds facilitates rolling of the gage over the film to be measured.

In contrast to the commonly used micrometers which permit direct readings of 1 mil and vernier readings to within the nearest 0.1 mil, the instruments of the aforementioned patent are characterized by an exceedingly high degree of linear resolution. A gage of this type, having a diameter of, say, 2 inches and a measuring range from, say, 0 to 4.0 mil, permits direct readings of 0.1 mil and readings by interpolation to within the nearest 0.01 mil. If the gage is provided with a measuring range from, say, 0 to 0.2 mil or from 0.2 to 0.4 mil, direct readings of 0.005 mil and readings by interpolation to the nearest 0.001 mil are possible. As an illustration of the accuracy that can be expected by using the foregoing instrument it should be noted that if the radius of the gage is 1 inch, then the length of the scale (one-half of a circle of 1 inch radius) is 3.1416 inches, or 3,141.6 mil. If the range of depth of film that can be determined with the particular gage is, for example, 0.2 to 0.4 mil, there is in effect an overall magnification of 15,708 times. Actually, however, in this particular embodiment of the invention, the degree of magnification is disuniform. In determining the depths of the measuring circumference below the circumferences of the outer wheels, it will be noted that these depths vary as a cosine function around the disk. Thus at 60° from the starting point of 0.2 mil the depth is 0.25 mil, at 90° it is 0.3 mil, at 120° it is 0.35 mil, and at 180° it is 0.4 mil. From these figures it can be seen that the maximum degree of accuracy in reading film thicknesses is in the ranges from 0.2 to 0.25 mil and 0.35 to 0.4 mil. However, even the scale from 0.25 to 0.35 mil depth covers a distance of 1.0472 inches, or 10,472 times the range of film depths that are measurable on this particular scale.

Now we have found that the gage claimed in the above identified patent produces results in the measuring of the thickness of various other materials besides wet films, which are far superior to the results obtained with other measuring devices, such as dial gages or micrometers, by simply resting the gage against a plane surface, inserting between the two outer wheels of the gage a narrow strip of the material the thickness of which is to be measured, and turning the gage from maximum minimum thickness until a binding is detected between the strip and the measuring surface when the strip is slightly pulled or pushed.

It is obvious that the broad scope of the present invention extends to any instrument involving the general principle on which the invention is based. For instance, inside or outside disks of other than circular shape can be employed to provide linear scales, or maximum measurement accuracy in the particular ranges of film depths that are desired to be measured.

We find the described instrument especially useful for the measuring of paper and like materials which, because of their yielding to pressure, do not give accurate micrometer readings. In addition, these gages are useful for thickness measurements of dry and semi-dry films in the foregoing manner, by first measuring the thickness of a coated strip of material, measuring the thickness of the base after removal of the coating or measuring a strip of uncoated material, and calculating the thickness of the film from the two measurements.

Furthermore, we have discovered that it is unnecessary to provide strips of coated and uncoated material in order to determine the thickness of dry films and that it is possible to take measurements of still greater accuracy when the tactile method of determining the point of contact between the film and the measuring surface is replaced by a visual determination.

In order to carry out the visual measurements it is only necessary to remove films at two points suitably spaced apart from each other to permit the outside wheels of the gage to rest on the uncoated base. The area from which the film is to be removed from each wheel need not be extensive, only about 1.5 x 0.5 cm. Prior to placing the instrument in position for taking measurements, the gage is preferably turned so that the highest reading on the measuring scale is about in alignment with the point of contact between the outer wheels of the gage and the base. Upon direct observation or by the use of a suitably adjusted mirror or lens, the degree of clearance between the measuring surface of the gage and the film can be seen. The observation is aided by light, preferably from a source of diffused light, directed toward the gage. As long as there is a gap between the measuring surface and the film, it is possible to observe a brightly illuminated strip or bar which has the width of the measuring surface of the gage, the height of which however varies with the distance of the measuring surface from the film. After positioning the gage in the indicated manner, it is slowly turned whereby the distance between the measuring surface and the film gradually diminishes until, after the gage having been turned to a certain position, the illuminated bar or strip disappears entirely. This is the point of contact at which the reading is taken.

The measurements are readily reproducible and the end points are sharp. As against film thickness measurements with most of the commonly used instruments the readings obtained with the herein claimed device tend to be high in many instances. However, if the results are compared with calculated film thicknesses determined by the weight-density method, the data obtained in this manner are in much closer agreement with the theoretical values than those obtained by means of other instruments. The reason for this we believe is the absence of any pressure whatsoever upon the film when determining the thickness by means of the herein disclosed device, while most other instruments depress the surface being measured. It must be kept in mind that even most of the so-called hard coatings in fact are of a more or less putty-like consistency and are readily deformable. The present invention permits the measuring of coatings regardless of their hardness without deformation.

The details of the invention will be understood by referring to the accompanying drawing in which.

Figures 1, 2:
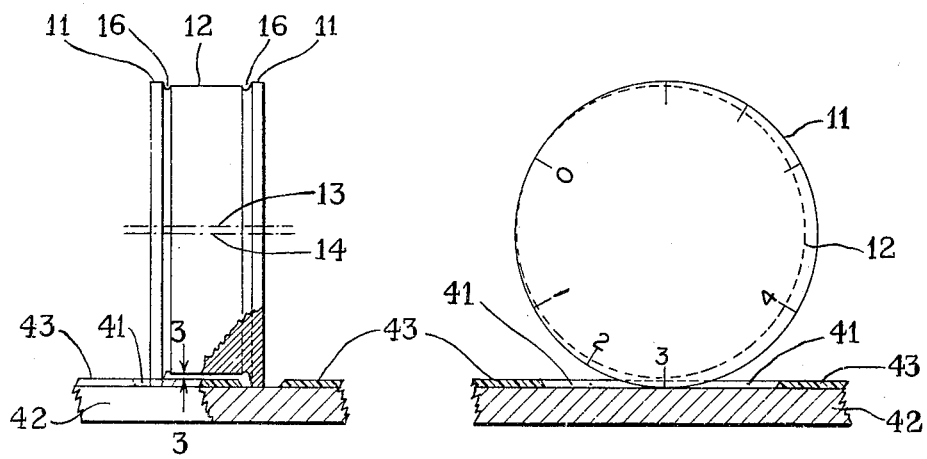
Fig. 1 is a schematic side view of the gaging element of the disclosed device in position to measure the thickness of a dry film.
Fig. 2 is a schematic front view of the gaging element in position to measure the thickness of a dry film.

Figs. 1 and 2 show the principle of adapting the preferred embodiment of the afore-identified disclosure for purposes of this invention. The radius of the gage is preferably about 1 inch and the width about ¾ inch. Larger dimensions may be employed for instruments designed to measure greater dry film thicknesses than are normally encountered in paint, varnish, and lacquer coatings. The numerals 11 represent two outer disk sections. Generally, a width of about 1/16 inch has been found satisfactory for the outer disk sections. An inner disk section 12 of lesser radius than sections 11 has an axis 13 which is perpendicularly offset from the axis 14 of the outer disk sections. This disk section 12 is of greater width than the outer disk sections and provides the measuring circumference of the instrument. By this construction the depth of the measuring circumference of disk 12 below the circumferences of the outer disks will be a minimum at a point where a straight line, which perpendicularly bisects line 14 and runs through the center of disk 12, strikes the outer circumference of said disk 12. At a point on the other side of said disk 12, which point is exactly opposite from the minimum point, the depth of the circumference of disk 12 below the circumferences of the disks 11 will be a maximum. The three disk sections may be separated by intermediate disk sections 16 which, having a smaller diameter than the outer and inner disk sections, form valleys or grooves between them. Although the intermediate disk sections are superfluous in most instances of measuring dry film thicknesses, they make the gage useful for also testing wet films, in that they allow space for the film displaced by the sections 11 to accumulate without affecting the level of the film directly under the measuring circumference of the section 12.

In using the instrument as a dry film thickness gage, the outer disks 11 of the gage are placed on exposed areas 41 of the base 42. For this purpose the coating 43 is removed at two spots having the proper distance from each other. These areas do not need to be large because, in determining dry film thicknesses, it is more practical not to roll but rather rotate the gage slidingly over one spot. The film thickness is determined by turning the gage over the film strip 44 which is left between the areas from which the coating has been removed until the gap 3—3 between the measuring circumference of the gage and the film is closed.

Figure 3:
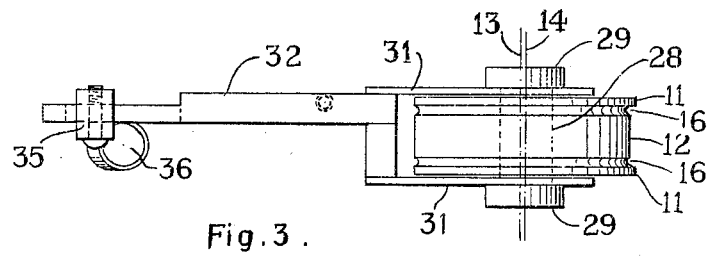
Fig. 3 is a top elevation of one embodiment of the claimed device.
Figures 4, 5:
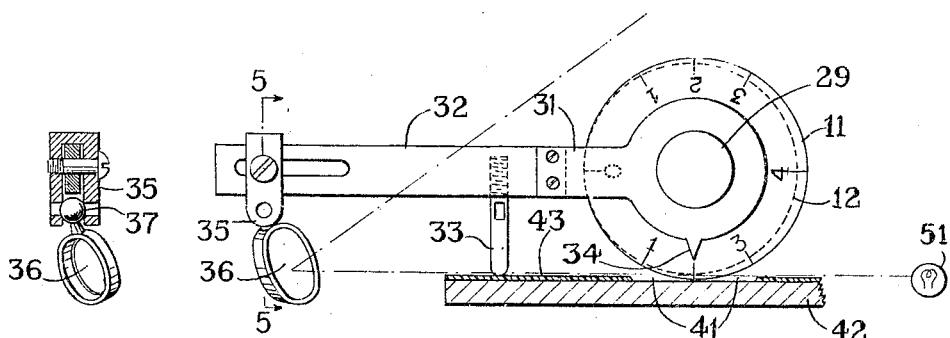
Fig. 4 is a front elevation of the said embodiment.
Fig. 5 is a cross sectional view of the mirror attachment on the line 5—5, Fig. 4.

Figs. 3 and 4 illustrate one assembled instrument for visually determining the closing of the gap 3—3. A shaft 28, having preferably removable caps 29 (which can have the shape of thumb and finger holds to make the gage useful for the measuring of wet film thicknesses) is set into an accurately machined bearing which is centered by the axis 14 of the two outer disks 11. Fixedly attached to the said shaft so that they encompass the gage, are two arms 31 which have a lever 32 attached to them. This lever extends to one side of the gage, preferably above and behind the orbit of the measuring circumference of the gage. A pointer 34 which is to indicate the thickness of the film by means of the graduation shown at the rim of the front part of the gage, is also fixedly attached to the shaft 28. We find it most practical to construct this pointer as part of one of the arms 31. Inasmuch as the pointer must always be held in a position perpendicular to the base upon which the instrument is set, it is important to provide a support which holds the lever 32 in the proper position. Depending upon the shape that is given to the lever, the support may be part of the lever proper or, as illustrated in Fig. 4, be a separate element 33, adapted to be adjusted in length and, if desired, terminating in a point which can be made to penetrate or to remove the coating. We find that, when dealing with the usual film thicknesses, there is practically no variation in the results, regardless whether the support rests on the surface of the coating or on the surface of the base. Only when measuring films having a thickness of 20 mil or more with this specific embodiment of the instrument, it is advisable to remove the film at the point of contact of the support.

If, for example, the point of contact of the lever is 2 inches away from the center of rotation of the gage, the error accrued in using an 0 to 4 mil gage on a 2 mil film is on the order of two millionths of an inch ($2 \times 10^{-6}$ inch). With a 0 to 0.4 mil gage, when measuring a 0.2 mil coating, the error is on the order of two hundred millionths of an inch ($2 \times 10^{-8}$ inch). These values are so small that there is no point in considering them. However, with a 20 to 60 mil gage, when measuring, say, a 40 mil coating, the error accrued is on the order of 0.2 mil, which is about one-half of one per cent (0.5%) of the film thickness being measured. Even this error can be readily eliminated without the removal of film underneath the point of support of the lever. The gradual rise of the measuring surface from a point of zero (or minimum) depth below the edges of the outer disk sections to a point of maximum depth below the edges of the outer disk sections and the subsequent return of the measuring surface to the point of zero depth provides an identical measuring scale in both directions from the zero position as indicated by the graduation at the margin of the front disk section shown in Fig. 4. Since an error is additive on one side and subtractive on the other side, the error vanishes by turning the gage in one direction for a first reading, then in the other direction for a second reading and taking the average of the two readings.

In view of the foregoing it is not a requirement to provide a lever with one point of support. The same degree of accuracy is attained with embodiments of the device as illustrated in Fig. 6 and 7, having a lever which rests at its entire length against the coating to be measured.

The length of the lever 32 is preferably restricted to about 3 to 4 inches. A slidingly adjustable sleeve 35 is positioned near the end of the lever. By means of this sleeve or by any other suitable means a mirror 36 is attached to the lever, in such a manner that about one-half of the mirror extends above the plane of the coating to be measured and the other half below the plane of the said coating. The mirror is made turnable, for instance, by means of a ball and socket joint 37, as illustrated in Fig. 5 which is a sectional view on the line 5—5, Fig. 4. For observation the mirror is turned about 25° toward the operator and slanted about 30° from the vertical position. Although a plane surface mirror is entirely satisfactory, the observation of the closing of the gap 3—3 (as indicated in Fig. 1) is aided by substituting a suitable concave cylindrical mirror the axis of which is kept horizontal. Through the distortion caused by this type of mirror the apparent gap between the measuring circumference of the gage and the film is wider than the actual gap.

At a suitable distance from the gage and at the side of the gage which is in line with, but opposite to, the mirror, there is a light source 51 positioned in or near the plane of the coating to be measured which throws diffused light at the gage or a narrow beam of light at the area including the bottom part of the measuring circumference of the gage and the part of the coating from which the measurement is to be taken.

Figure 6:
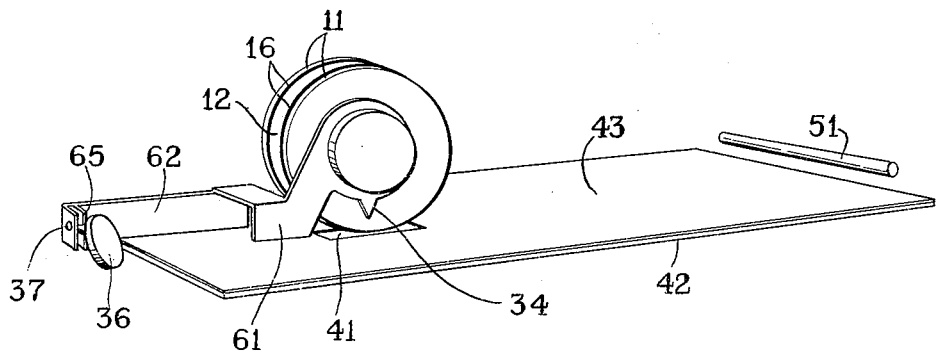
Fig. 6 is a perspective view of another embodiment of the device in position to measure the thickness of a film.
Figure 7:
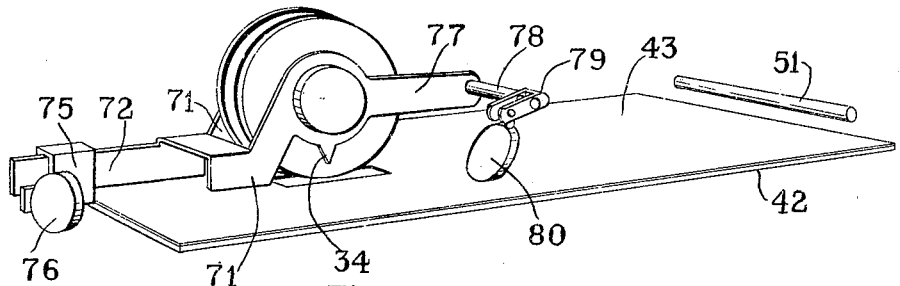
Fig. 7 is a perspective view of still another embodiment of the device.

Fig. 6 depicts a different type of lever attachment, which can be cast from any suitable material, or can be stamped from sheet metal. In view of the stability of the gage itself it is entirely satisfactory if, as shown in this drawing, the lever 62 is attached to the gage by means of a single lever arm 61. As in the foregoing embodiment, measurements are taken with the aid of a light source 51 and a mirror 36. However, the distance of the mirror from the gage is fixed in this instance, in that the mirror is held in position by means of a ball and socket joint 65, or by other means of support which are permanently fastened to the end of the lever.

Figure 8:
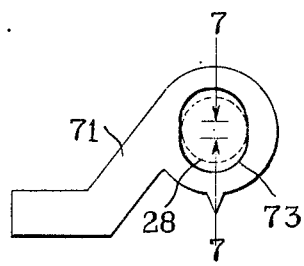
Fig. 8 is a front view of one of the lever arms shown in Fig. 7.

Fig. 7 illustrates still another embodiment of the device, which is characterized by automatically eliminating any error that may accrue from the lever resting on the film surface instead of resting on the base. For this purpose, the lever arms, instead of being fixedly attached to the shaft of the gage, provide a floating mounting by means of which the gage is freely movable for a short distance in the vertical direction. As a result thereof the pointer is always perpendicular to the base regardless whether the lever rests on the base or on the coating. As shown in Fig. 8, in order to enable this vertical movement of the gage, the lever arms 71 of the present embodiment have an oval shaft annulus 73, which may be defined as being nearly circular with depressions on either side, so that it fits the shaft 20 in width, but provides the clearance 7—7 in height. The amount of clearance required depends upon the maximum thickness of the films which are to be measured. A clearance or play of, say, 60 mil downward from the center will allow the use of all ranges of gages up to 60 mil.

A lens 76 is provided for measuring purposes in lieu of the mirror of the afore-described embodiments. This lens is clipped onto the lever 72 by means of a focusing rider 75 so that it overhangs the edge of the panel to be measured. For example, a lever attachment extending about seven inches from the point of contact between the measuring surface of the gage and the film requires a 6 diopter lens.

An additional improvement consists in extending one of the lever arms 71 to provide the supporting member 77 for a rod 78 and a ball and socket joint 79, or for other means of holding the mirror 80 which is turned in such a way that the operator is able to read the gage without abandoning the position for looking through the lens.

If desired the numerals of the measuring scale can be reversed to make them appear correctly in the mirror if the readings are taken in this manner.

Although it is entirely adequate to rotate the gage by hand until the point of contact has been established between the measuring surface of the gage and the film which is to be measured, it is obvious that the adjustment can be accomplished by various other means, such as placing the device in a cradle and attaching a worm gear for turning the gage.

We claim:

1. A dry film thickness gage constructed by adding an attachment to a wet film thickness gage comprising a composite body made up of two coaxial outer circular disk sections having equal radii, an eccentric inner circular disk section of lesser radius having a band-like measuring surface around its circumference, said measuring surface having a point of minimum depth below the edges of the outer disk sections which is at least equal to the thickness of any film to be measured and a point of maximum depth below the edges of the outer disk sections which exceeds the thickness of any film to be measured, a graduation at the margin of one of the outer disk sections showing in appropriate units the depth of the circumference of the inner disk section below the circumference of the outer disk sections and a shaft journaled through the composite body and centered by the axis of the two outer disk sections to rotate the said composite body, the said attachment comprising arms cradling said shaft and joining in a lever extending to one side of the said composite body without obstructing the orbit of the measuring surface, part of one of the said arms being shaped into a pointer adjacent to and cooperating with the graduation at the margin of one of the outer disk sections, said pointer extending perpendicularly from the center of the said shaft toward a plane surface when the said composite body and the said lever is rested against such a surface, and an optical system associated with the said composite body and the said attachment to observe a beam of light passing beneath the said measuring surface, and the said graduation from the same viewing position.

2. The attachment of claim 1, having arms which annularly encompass the shaft of the composite body and which are tied to the said shaft by means of caps.

3. The attachment of claim 2, having a lever provided with a support which is adjustable in length.

4. The attachment of claim 2, having a lever provided with a sharply pointed support.

5. The attachment of claim 1, having arms which cradle the shaft of the composite body in oval annuli, providing for the said shaft a latitude of play vertically downward which is at least equal to the thickness of any film to be measured.

6. A dry film thickness gage constructed by adding an attachment to a wet film thickness gage comprising a composite body made up of two coaxial outer circular disk sections having equal radii, an eccentric inner circular disk section of lesser radius having a band-like measuring surface around its circumference, said measuring surface having a point of minimum depth below the edges of the outer disk sections which is at least equal to the thickness of any film to be measured and a point of maximum depth below the edges of the outer disk sections which exceeds the thickness of any film to be measured, intermediate disk sections of lesser radii separating the first named three disk sections, a graduation at the margin of one of the outer disk sections showing in appropriate units the depth of the circumference of the inner disk section below the circumference of the outer disk sections and a shaft journaled through the composite body and centered by the axis of the two outer disk sections to rotate the said composite body, the said attachment comprising arms cradling said shaft and joining in a lever extending to one side of the said composite body without obstructing the orbit of the measuring surface, part of one of the said arms being shaped into a pointer adjacent to and cooperating with the graduation at the margin of one of the outer disk sections, said pointer extending perpendicularly from the center of the said shaft toward a plane surface when the said composite body and the said lever is rested against such a surface, and slidingly attached to said lever a mirror centered in the orbit of the said measuring surface and provided with means for angular adjustment.

7. A dry film thickness gage constructed by adding an attachment to a wet film thickness gage comprising a composite body made up of two coaxial outer circular disk sections having equal radii, an eccentric inner circular disk section of lesser radius having a band-like measuring surface around its circumference, said measuring surface having a point of minimum depth below the edges of the outer disk sections which is at least equal to the thickness of any film to be measured and a point of maximum depth below the edges of the outer disk sections which exceeds the thickness of any film to be measured, intermediate disk sections of lesser radii separating the first named three disk sections, a graduation at the margin of one of the outer disk sections showing in appropriate units the depth of the circumference of the inner disk section below the circumference of the outer disk sections and a shaft journaled through the composite body and centered by the axis of the two outer disk sections to rotate the said composite body, the said attachment comprising arms cradling said shaft and joining in a lever extending to one side of the said composite body without obstructing the orbit of the measuring surface, part of one of the said arms being shaped into a pointer adjacent to and cooperating with the graduation at the margin of one of the outer disk sections, said pointer extending perpendicularly from the center of the said shaft toward a plane surface when the said composite body and the said lever is rested against such a surface, and an optical system comprising a lens attached to said lever and centered in the orbit of the said measuring surface, and a mirror adjacent to the composite body, adjusted to observe the said graduation from the position for viewing the lens.

MAYNARD R. EUVERARD.
PAUL N. GARDNER.

REFERENCES CITED

The following references are of record in the file of this patent:

UNITED STATES PATENTS

| Number | Name | Date |
| --- | --- | --- |
| 530,686 | Gray | Dec. 1, 1894 |
| 1,909,652 | Bower | May 16, 1933 |
| 1,927,821 | Abbott | Sept. 26, 1933 |

OTHER REFERENCES

Circular of the Henry A. Gardner Laboratory, Inc., Bethesda, Md.: "Interchemical Direct Reading Wet Film Thickness Gage," published December 1947.